Figure 1:
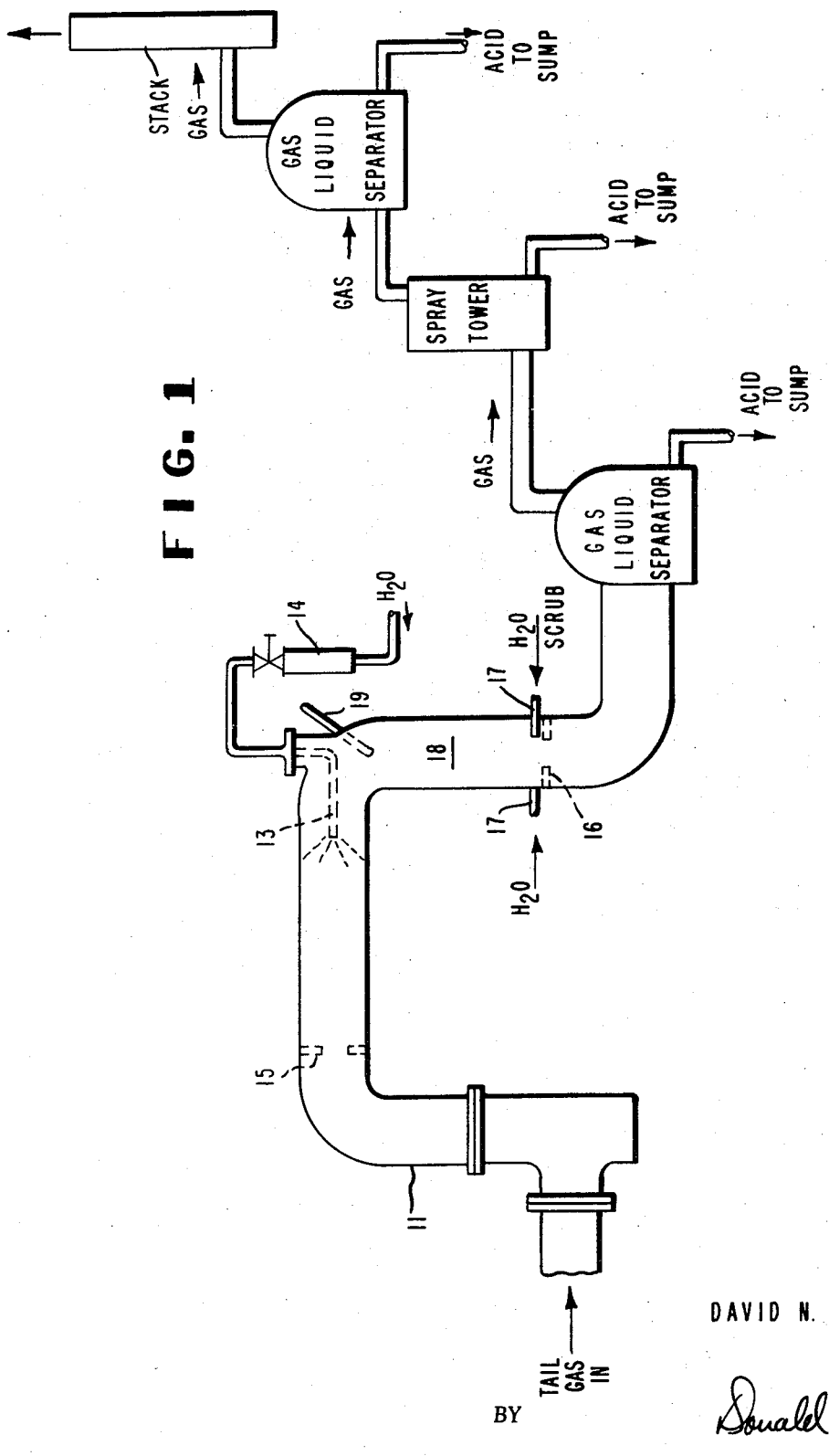

United States Patent

Low

[15] 3,690,041
[45] Sept. 12, 1972

[54] SCRUBBING OF GASES CONTAINING TICL₄

[72] Inventor: David N. Low, Wilmington, Del.

[73] Assignee: E. I. du Pont de Nemours and Company, Wilmington, Del.

[22] Filed: Sept. 30, 1971

[21] Appl. No.: 185,254

[52] U.S. Cl. .................. 55/71, 23/87 T, 23/202 R
[51] Int. Cl. ............................................... B01d 47/00
[58] Field of Search....23/87 T, 202 R, 202 V; 55/71, 55/84, 220, 223

[56] References Cited

UNITED STATES PATENTS

| | | | |
|---|---|---|---|
| 2,306,184 | 12/1942 | Pechukas | 23/87 X |
| 3,118,732 | 1/1964 | Richards et al. | 23/202 V |
| 3,219,411 | 11/1965 | Cheever et al. | 23/202 V |
| 3,370,401 | 2/1968 | Lucas et al. | 55/90 |
| 3,607,049 | 9/1971 | Weaver, Jr. et al. | 23/202 V |
| 3,615,163 | 10/1971 | Brozozowski | 23/87 T X |

Primary Examiner—Reuben Friedman
Assistant Examiner—R. W. Burks
Attorney—Donald A. Hoes

[57] ABSTRACT

Industrial gas streams containing sizable amounts of HCl have in the past been efficiently scrubbed by large amounts of water or water solutions. But when a gas stream has also contained $TiCl_4$ vapor, as when $TiO_2$ has been produced via the "chloride" process, even scrubbing has not prevented an opaque plume from being vented to the atmosphere. The plume disappears or is markedly reduced in intensity, however, if a controlled amount of water is evaporated into the gas stream before scrubbing.

3 Claims, 2 Drawing Figures

SCRUBBING OF GASES CONTAINING TICL

BACKGROUND OF THE INVENTION

In the manufacture of TiO₂ by the chloride process, there results an anhydrous "tail" gas which contains a small amount of TiCl₄ and much larger quantities of HCl gas, CO, and inert gases including CO₂ and N₂. The gas stream is generally at or near atmospheric pressure and may be chilled.

The gas stream described above is a common one in the chemical industry except for the small amount of TiCl₄. In the common case it is usual practice to remove the HCl component in a scrubbing device, e.g. venturi scrubber, orifice scrubber or the like, where the HCl is absorbed into a contacting water stream. Such practice is usually highly successful because of the extremely low vapor pressure of HCl gas over HCl solution near atmospheric conditions. In a typical case in which the process exit gas is passed through a water spray tower before finally venting to the atmosphere, it is practical to obtain a 200:1 reduction in the HCl concentration before the gas is released to the atmosphere. In such a case, the HCl is absorbed as a gas directly into the scrubber water and there is usually no visible plume at the final stack discharge. However, in similar waste gas streams which contain a small fraction of TiCl₄ vapor (for example 0.1 percent) and a larger fraction of HCl (for example 10 percent) a fine mist, apparently of acid droplets and titanium compounds, is formed when the gas stream first contacts water. These droplets in the mist are extremely small, being in the micron range, and as such are difficult to remove from the gas. If the droplets are not removed, they present a highly visible stack plume even though the amount of acid and TiCl₄ appear to be negligibly small. Since most air pollution regulations limit the opacity of stack emission, it is highly desirable to eliminate or reduce the visible plume even though it may carry only a negligible acid loading.

To illustrate the foregoing, it is noted that in one installation a spray tower was found to remove only 67 percent of the acid component from a gas stream initially containing 0.078% TiCl₄ and 4.5% HCl. However, in a test of this same spray tower with a synthetic gas stream containing the same amount of HCl but no TiCl₄, the acid reduction through the spray tower was 99.5 percent. As further evidence of the difficulty of scrubbing the visible plume from a gas stream with a TiCl₄ fraction, the following statement is taken from a translation published Russian literature: *The Synthesis of Hydrolysis Products of Titanium Tetrachloride,* by L. N. Shchegrov et al., Tr. VSES, Nauchn. Issled. Inst., Khim. Reaktivov, No. 25:470-8 (1963)

"It was determined in preliminary experiments that it is impossible to recover the unreacted titanium tetrachloride completely by using only the above-described system of liquid absorbents: the fog formed thereby, which constitutes the products of partial hydrolysis of the titanium tetrachloride, suspended in the air stream, was not completely recovered even after passing through 15 consecutively connected bubbling absorbers."

While it has thus been evident that a gas stream carrying a large concentration of HCl and a less amount of TiCl₄ vapor could be cleared of the acid component with considerable ease if the effect of the TiCl₄ component were somehow removed, an economical and efficient means for achieving this has not previously been available.

SUMMARY OF THE INVENTION

In accordance with the invention an improvement is provided in a method wherein an anhydrous gas stream composed predominantly of inert gases and containing appreciable quantities of HCl and TiCl₄ is to be contacted with an aqueous base liquid in an amount in excess of that required to saturate the stream with water to thereby absorb the HCl in the form of an HCl solution. More particularly it has been found that an improvement in such a method can be achieved leading to elimination or at least substantial reduction in the opacity of the gas upon being vented to the atmosphere. The improvement involves evaporating an initial and restricted quantity of water into the stream of anhydrous gas at least one-twentieth sec. prior to the regular scrubbing operation in which the gas is contacted with a saturation amount of water. The initial quantity of water evaporated into the stream must be less than that required to saturate the stream at the existing temperature and pressure conditions but greater than that stoichiometrically required to react with the TiCl₄ in the stream to form TiO₂.

The finding of the present invention thus is that with a gas stream containing TiCl₄ and HCl, a critical controlled water treatment, i.e. to produce a gas containing water in subsaturation amounts, in advance of the usual water scrubbing step, remarkably and surprisingly reduces the opacity of the stream upon being vented to the atmosphere. The exact reasons for this phenomenon are not fully known but either of two possibilities, or a combination of both, appear to be involved. Thus on the one hand, it is considered that by initially limiting the amount of water that is available for reaction with the TiCl₄ (the reaction is known to be virtually instantaneous) only the more soluble forms of titanium oxychlorides are produced, i.e. in preference to TiO₂, Ti(OH)₂ or less soluble oxychlorides, and these are then readily removed in the subsequent scrubbing step. Alternatively, or perhaps cojointly, it is possible that the limited quantity of water tends to produce, at least temporarily, a highly acidic condition which itself quickly promotes dissolution of the TiCl₄ component, either as such or as some other form of a titanium compound. In either event, the TiCl₄ component of the gas stream is unable to serve in the generation of mist upon being contacted with water in subsequent scrubbing step.

In any case, the quantity of water used to pretreat the gas stream, i.e. treat it in advance of the typical water scrubbing step, must be within specific limits. The minimum quantity needed is that which is theoretically required to chemically combine with the TiCl₄ in the gas stream according to the equation $$TiCl_4 + 2H_2O \longrightarrow TiO_2 + 4HCl$$

This is not to imply, however, that TiO₂ is necessarily the reaction product, since other hydrolysis products are also possible depending upon temperature and other conditions.

As regards the maximum amount of water which can be used in the pretreatment, it has been demonstrated that a successful reduction in the intensity of the plume is not achieved if the stream becomes saturated with water such that fine particle size, i.e., submicron size, liquid water droplets are formed. Such liquid droplets would, once formed, be carried through the scrubbing operation and be eventually discharged into the atmosphere giving the appearance of a dense white plume. Advantageously, the amount of water to be supplied and sprayed into the stream of gas will be regulated at a level which is below 100 percent, i.e. 1 to 99 percent of that which would saturate the gas at the temperature and pressure conditions existing upon the water addition. In general, it is preferred that, to be on the safe side, there be used an amount which is less than 50 percent of the water that would saturate the gas.

If for example one is given a tail gas from the chloride $TiO_2$ process containing 0.3 volume % $TiCl_4$ flowing at a rate of 4,000 s.c.f./m. at 70°C. and 3 p.s.i.g. then it can be calculated that, as a minimum, 0.144 gal./min. $H_2O$ will have to be supplied in the pretreatment for that is the amount stoichiometrically required to react with the $TiCl_4$ in the tail gas. Ignoring, temporarily, the cooling effect that occurs upon introducing water, it can also be calculated from known vapor pressure data that 7.6 gal./min. $H_2O$ would be required, assuming 100 percent mixing efficiency, to saturate the particular stream with water. Thus a flow rate could be selected between the extremes of 0.144 gal./min. and 7.6 gal./min. Should it be found that a cooling occurs to, say, 60°C., the latter or maximum would have to be corrected to 4.36 gal./min.

It is to be understood that the determinative factor is the quantity of water actually evaporated into the gas stream during the course of the pretreatment. There is no disadvantage in introducing an excess of water provided that other factors such as mixing efficiency, contact time and the like are such as to prevent the entire amount of supplied water from actually evaporating. Most conveniently, however, there will be introduced to the gas stream a predetermined quantity of water which is within the range described above and under conditions, i.e. with sufficient atomization evenly across the cross section of the stream so as to promote uniform contact. In this regard it will be understood that while the hydrolysis of $TiCl_4$ occurs virtually instantaneously, at least a small equilibration period is needed prior to contacting the stream with gross quantities of scrubbing water. In general at least one-twentieth of a second and preferably at least one-half of a second is required for equilibration to take place. By extending the length of the conduit between the location of the pretreatment inlet and the scrubbing apparatus, the equilibration period is increased.

As a practical matter, a suitable subsaturation condition is best ascertained by observing the intensity of the plume that results as the scrubbed gas is vented to the atmosphere. Between the extremes of too much water and too little water, each of which will tend to give an intense, highly opaque plume, there will be an intermediate range where the amount of water of water can be readily controlled so as to achieve a notable reduction in plume opacity.

While the invention will be described with reference to the use of liquid water as the pretreating liquid, it is to be understood that satisfactory results can be achieved if the water contains additives which are essentially of an inert nature. For example, acids such as HCl, which may be recycled from the process itself, may be provided in the water to be used. Direct evaporation of liquid water appears to be essential as steam does not afford a comparable reduction in the visibility of the plume unless caused to condense for subsequent evaporation.

The invention is applicable, as indicated hereinbefore, to anhydrous gas streams containing a major proportion, by volume, of inert gas and lesser proportions of HCl and $TiCl_4$. It is not uncommon that tail gases from a chloride $TiO_2$ process will contain on the order of 2 to 20% HCl and 0.01 to 0.5% $TiCl_4$, these percentages being on a volume basis. The low percentage of the latter is readily attainable by condensation procedures which, perform subsequent to the oxidation process, are typically used to recover unreacted $TiCl_4$. In any case the process of the present invention is readily applicable to gases of the foregoing compositions. Other constituents in the gas appear to have little effect upon the results which are obtained although it may be desirable to employ a special treatment to separate certain noxious gas components before venting to the atmosphere. For example, the elimination of $Cl_2$ gas can be facilitated by a caustic scrub.

It is to be understood that the means employed to actually separate the HCl from the gas stream, i.e., the scrubbing apparatus, is not a critical feature of the invention. Thus the process of the invention has been demonstrated in conjunction with a variety of scrubbing devices including venturi scrubbers, orifice scrubbers, demisting devices, spray towers, etc. The choice of the scrubbing device or devices depends upon the exact nature of the gas to be treated, the efficiency of the HCl removal which is desired, and economics.

Figure 2:
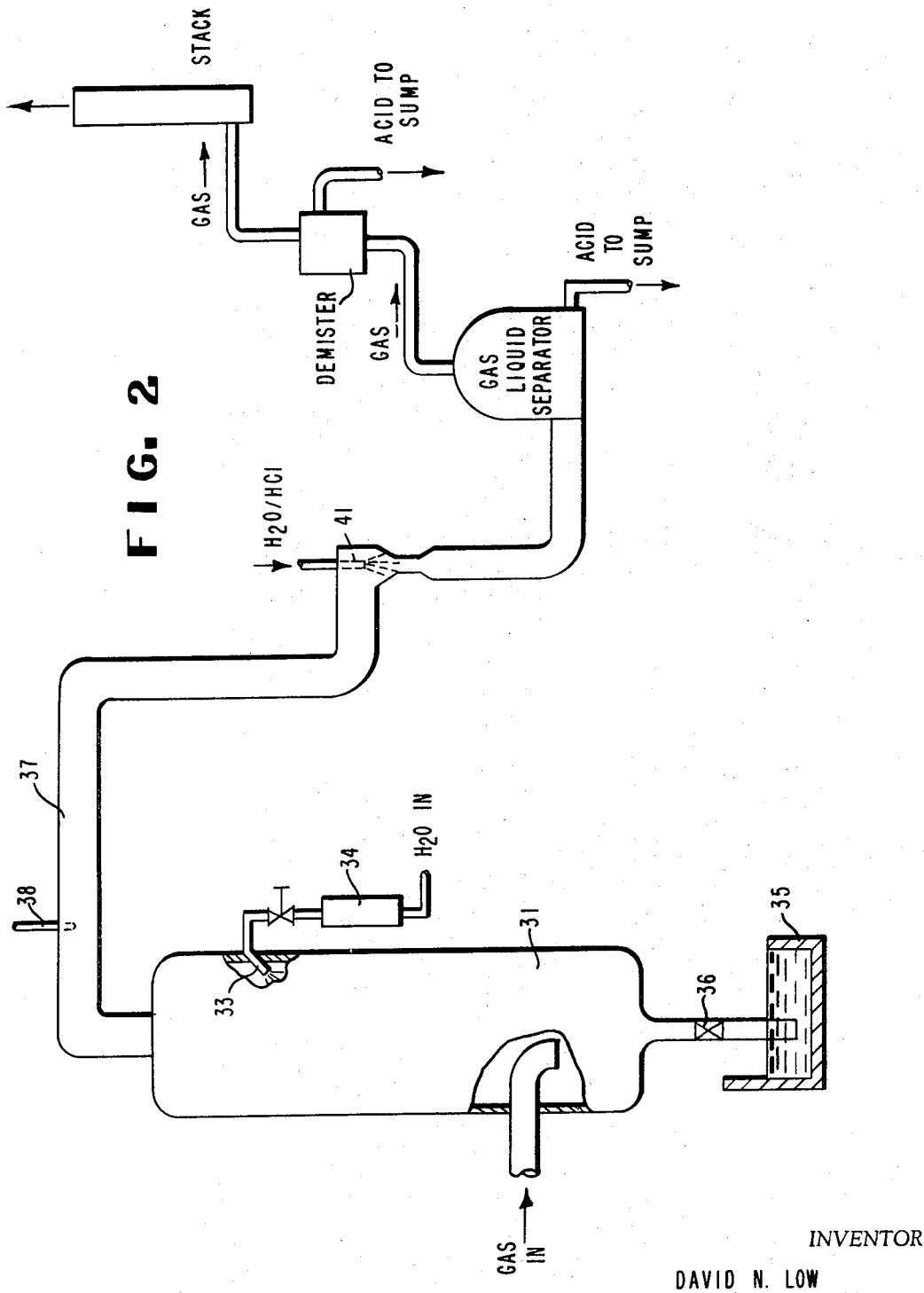

FIGS. 1 and 2 illustrate, in schematic form, embodiments of the invention for first pretreating a gas stream with a small amount of water followed by a scrubbing operation which is performed in the usual way. The details of these figures will be described in connection with Examples I and II, which follows:

EXAMPLE I

The gas treating apparatus corresponds generally to that depicted schematically in FIG. 1 wherein the tail gas stream at a relatively high velocity is sequentially subjected to (a) a water pretreatment under conditions of a short holdup time, (b) a scrubbing step using a large quantity of water in a conventional orifice scrubber, (c) a gas-liquid separation, (d) a second scrubbing step using a large quantity of water, (e) a second gas-liquid separation and (f) passage of the gas to the vent stack.

The gaseous stream is that resulting from a chloride $TiO_2$ process and typically is analyzed as follows on a volume percent basis:

| | | |
|---|---|---|
| $N_2$ | ) | |
| CO | ) | 87.1% |
| $Cl_2$ | ) | |
| HCl | | 12.8% |
| $TiCl_4$ | | 0.1% |
| $H_2O$ | | 0.0% |

The gas stream enters duct 11, a 20 inch diameter corrosion resistant conduit, on the average at a rate of 3,320 s.c.f./min., a pressure of 2 p.s.i.g., and a temperature of 74°C. A fine spray of water is directed from the nozzle 13 substantially across the entire cross section of duct 11 to pretreat the gas with a limit amount of liquid water, i.e. under subsaturation conditions. The flow water to nozzle 13 is controlled by flowmeter 14. An annular plate 15, located 4 feet from nozzle 13 and having a 12 inch diameter opening, serves to avoid upstream migration of water.

The gas stream then passes to a conventional gas scrubbing system. Initially it is treated in an orifice scrubber formed by an annular plate 16, having an opening about 6.75 inches in diameter, above which is positioned a pair of scrubbing water inlets 17. The inlets are circumferentially spaced about 11 to direct, tangentially with respect to the duct interior, streams of water into contact with the gas stream thereby to absorb the HCl component. The distance from nozzle 13 to inlets 17, forming a zone shown generally as 18, is approximately 3.5 feet. A thermometer 19 measures the temperature of the subsaturated gas stream in zone 18.

The mixture of gas and HCl solution so produced then passes to a cyclone which serves as a gas-liquid separator with the HCl solution, containing about 70 weight percent of the HCl in the gas, being drawn off for concentration, recycling, or other use. The gas fraction is then given a second scrubbing in a 20 foot high, 7 foot diameter spray tower to which water is being fed at a rate of 2,800 gal./min. This removes the bulk of the remaining 30 weight % HCl. After a second cyclone separation, the gas is vented to the atmosphere through a stack.

In operation the quantity of water passing through nozzle 13 is regulated to give the least amount of stack plume, which is a rate of about 1 gal./min. This provides a cooling effect which is indicated by the temperature dropping from 74° to 59°C. in zone 18. The quantity of water introduced through inlets 17 at the orifice scrubber is regulated at the rate of 80 gal./min. Under these conditions, little or no visible smoke plume is observed at the vent stack as the scrubbed gas passes into the atmosphere.

By calculation a gas stream of 3,320 s.c.f./min. at 59°C., 2 p.s.i.g., would require 2.95 gal./min. of water to saturate the stream. The 1 gal./min. rate thus being charged to the nozzle 13 produces only about one-third of theoretical saturation.

Also by calculation it is determined that with 0.1 percent by volume $TiCl_4$ in the gas stream, 0.035 gal./min. of water is required to theoretically react with the $TiCl_4$ to produce $TiO_2$. Thus the 1 gal./min. rate is well in excess of the minimum that would be needed.

Using the same arrangement the amount of water being introduced at nozzles 13 is varied over a wide range with, in each case, little or plume being observed at the vent stack. Thus at a 0.35 gal./min. rate and even at a 2.5 gal./min. rate, little or no plume is observed. However, if the amount of water introduced at nozzles 13 exceeds 2.95 gal./min. such that a saturated condition is produced in zone 18, a heavy white plume begins to form. A similar condition is observed if no water is introduced at 13 or if it is used in an insufficient quantity.

EXAMPLE II

The gas treating apparatus corresponds generally to that schematically depicted in FIG. 2 wherein a relatively low velocity stream is sequentially subjected to (a) a water pretreatment under conditions of long holdup time, (b) a scrubbing step using a large quantity of an aqueous solution in a conventional venturi scrubber, (c) a gas-liquid separation, (d) a demister and (e) passage of the gas to the vent stack.

The gaseous stream is essentially the same as that described in Example 1 except that the volume % HCl is about 5 percent and the volume % $TiCl_4$ is about 0.11 percent.

The gas stream enters spray tower 31, a 5 foot diameter 20 foot high corrosion resistant vessel, at an average rate of 1,435 s.c.f./min., a pressure of 6 p.s.i.g., and a temperature of −10°C. A thin stream of water is directed from nozzle 33 into vessel 31 to pretreat the gas with a limited amount of liquid water, i.e. under subsaturation conditions. Although the stream of water is not evenly distributed across the cross section of the vessel, the large residence time of the gas therein coupled with the strong affinity of $TiCl_4$ for water provides the necessary contact. The flow of water to nozzle 33 is controlled by flowmeter 34. Unvaporized water, in the form of an acid solution, is drawn off into sump 35 through liquid seal 36.

The gas stream found to now be at about +15°C. then passes trough an 8 inch diameter corrosion resistant duct 37, in which temperature is measured by a thermometer 38, to a low (3inches $H_2O$) pressure drop venturi scrubber formed by the discharge of about 30 gal./min. recycled HCl solution (averaging 20–31 weight percent concentration) from a nozzle 41 downwardly into a throat constriction. Some 60–70 weight percent of the HCl component of the gas is removed by the combined action of the spray tower and venturi.

The mixture of gas and HCl solution then passes to a cyclone which separates the gas and the HCl solution. The gas fraction then passes to a demister of type described in Lucas et al U.S. Pat. No. 3,370,401, in which an inert wire mesh forms the fibrous bed. The bulk of the HCl remaining in the gas is thus removed.

In operation the quantity of water passing through nozzle 33 is regulated at an average rate of 1 gal./min. but about 98 percent by weight of this amount is removed at 36. With the volume of gas being treated, a subsaturated condition exists in duct 37. Under these conditions little or no visible smoke plume is observed at the vent stack as the scrubbed gas passes into the atmosphere. A distinct plume begins to form, however, if the water passing to power 31 is stopped altogether or if it is increased to the point where the submicron size droplets are being formed by a saturated condition therein.

I claim:

1. In a method wherein an anhydrous gas stream composed predominantly of inert gases and containing appreciable quantities of HCl and $TiCl_4$ is contacted with an aqueous based liquid in an amount in excess of that required to saturate the stream with water to thereby absorb the HCl in the form of an HCl solution, the improvement wherein at least one-twentieth second prior to said contact an initial quantity of water is evaporated in the stream, said quantity being less than that required to saturate the stream at the existing temperature and pressure conditions but greater than that stoichiometrically required to react with the TiCl$_4$ in the stream to form TiO$_2$.

2. Method according to claim 1 wherein said initial quantity of water is less than 50 percent of that required to saturate the stream.

3. Method according to claim 1 wherein the gas stream is a tail gas from a chloride TiO$_2$ process.

* * * * *